Patented Aug. 6, 1946

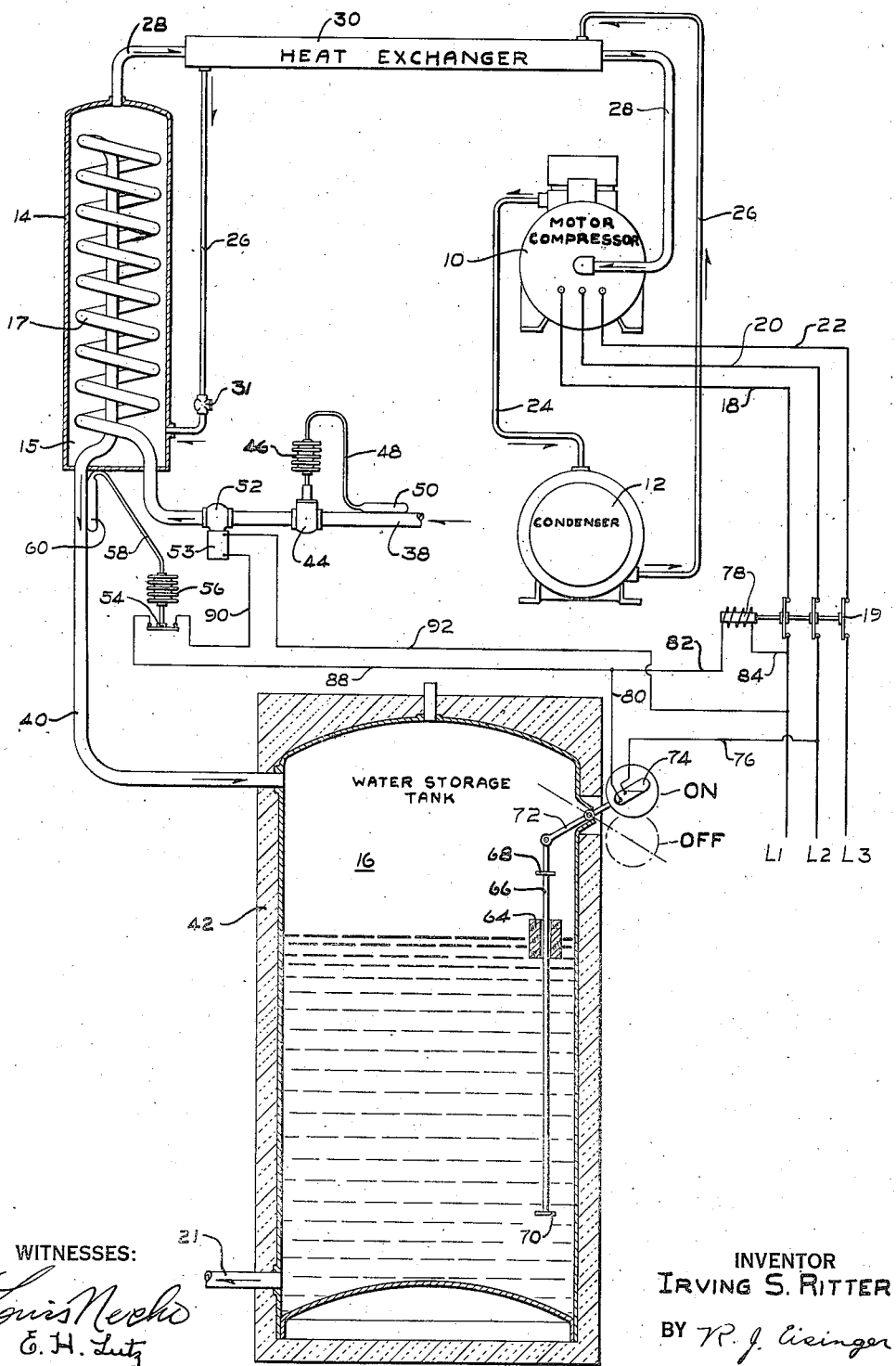

2,405,448

UNITED STATES PATENT OFFICE 2,405,448

REFRIGERATING APPARATUS

Irving S. Ritter, Plainfield, N. J., assignor, by mesne assignments, to Westinghouse Electric Corporation, East Pittsburgh, Pa., a corporation of Pennsylvania Application January 13, 1945, Serial No. 572,619

5 Claims. (Cl. 62—7)

This invention relates to refrigerating apparatus and, more particularly, to a water cooling system.

One object of the invention is to produce an improved water cooling system.

In certain industrial installations, a constant supply of water, chilled to a predetermined temperature, is required. Since the temperature of incoming water will vary considerably from summer to winter, the compressor load will vary accordingly. For example, a bottling plant or the like may require one hundred gallons of water per hour at a temperature of 35° F. If the temperature of incoming water is assumed to vary from a minimum of 45° F. to a maximum of 90° F., the compressor load will vary from 8330 to 45,815 B. t. u. per hour. In other words, the minimum load will be about 18 per cent of the maximum load of the compressor. This results in short-cycling of the compressor when the incoming water is relatively cold and makes it difficult to control the temperature of the chilled water available for use.

It is, therefore, a further object of the invention to produce an improved water cooling system in which the compressor load will be more nearly constant regardless of the temperature of the incoming water.

A still further object of the invention is to eliminate short-cycling of the compressor, that is, to provide less frequent and longer periods of compressor operation.

A still further object of the invention is to so regulate the flow of the water to be chilled as to utilize the full capacity of the compressor.

A still further object is to so regulate the flow of water to be chilled into the cooling unit that the water will be cooled to the desired degree while flowing in a continuous stream instead of intermittently.

A still further object of the invention is to produce an improved water cooling system by means of which the temperature of the chilled water can be readily and more accurately controlled so as to maintain a supply of chilled water having the desired uniform temperature.

These and other objects are effected by the invention as will be apparent from the following description and claims taken in connection with the accompanying drawing forming a part of this application and which illustrates, diagrammatically, a water cooling system embodying the invention.

In carrying out my invention, I provide means for varying the flow of incoming water into the cooling unit of the system inversely with the temperature of the incoming water. When the temperature of the incoming water is high, the valve admits the water at the relatively low rate at which the refrigerating means can cool the same to the desired temperature. As the temperature of the incoming water becomes lower, the refrigerating system is capable of cooling a greater quantity of water and hence the valve correspondingly increases the rate of flow so as again to cool that quantity of water which the system is capable of cooling to the desired temperature. By this means, the operation is controlled to provide chilled water of the desired temperature while at the same time maintaining substantially constant, full load on the refrigerating apparatus. Also the water will be cooled to the desired degree while flowing in a continuous stream instead of intermittently.

Also I provide a relatively large, heavily insulated tank capable of storing a relatively large volume of the chilled water, thereby permitting the refrigerating means to operate continuously until the tank is filled, and to remain inactive while the stored water is being used, thus eliminating short-cycling of the refrigerating means. The storage tank is provided with a suitable outlet 21 through which chilled water may be withdrawn for use.

Since, after a relatively long shut-down period which takes place while the chilled water stored in the tank is being used up, the temperature of the cooling unit and the water therein rises appreciably, means is preferably provided for preventing flow of water from the cooling unit into the storage tank until the temperature of the water has been lowered to the desired value.

As illustrated, my improved water cooling system includes a refrigerant motor compressor 10, a refrigerant condenser 12, a water cooling unit 14 and a chilled water storage tank 16. The cooling unit includes a chamber 15 in which liquid refrigerant is vaporized, and a coil 17, disposed in the vaporizing chamber 15 and through which the water to be chilled is adapted to flow. The motor compressor is energized by electrical conductors 18, 20 and 22, which are adapted to be connected to electric supply lines $L_1$, $L_2$ and $L_3$, by means of a switch 19. The refrigerant compressed by the compressor is delivered to the condenser by a pipe 24 and the refrigerant liquefied in the condenser is delivered to the lower portion of the vaporizing chamber 15 by a pipe 26. The evaporated refrigerant is returned to the compressor through a pipe 28 leading from the upper portion of the vaporizing chamber 15. The liquid refrigerant and the vaporized refrigerant are brought into heat transfer relation with each other in a heat exchanger 30.

The flow of liquid refrigerant into the vaporizing chamber 15 of the cooling unit is regulated by any suitable type of expansion valve as, for example, a conventional thermostatic expansion valve indicated diagrammatically at 31 and operating in response to the superheat of the vaporized refrigerant passing from the heat exchanger 30 to the compressor, in a manner well known in the art.

The water to be chilled is supplied to the coil 17 of the cooling unit through a pipe 38, and the chilled water is delivered to the storage tank by any suitable connection, such as a pipe 40, leading from the discharge end of the coil 17 to the upper portion of the storage tank. The storage tank is heavily insulated as at 42.

In order to vary the rate of flow of water into the cooling unit in accordance with the temperature of the water to be chilled, I provide a valve 44 which is operated by a bellows 46 responsive to the pressure of a gas, volatile liquid or other expansible medium confined in a pipe 48 and a bulb 50 which is in intimate heat transfer relation with the pipe 38. The pressure of the gas or other medium in the bulb 50 will thus vary with the rise and fall of the temperature of the water in the pipe 38, and the structure of the valve 44 and bellows 46 is such that, as the temperature of the water in the pipe 38 rises, the valve 44 acts to restrict the flow of water therethrough, and vice versa. By this means, a constant, full load is imposed on the refrigerating means and the temperature of the water is lowered to the desired value in a continuous stream instead of intermittently.

In order to prevent the flow of water from the cooling unit to the storage tank until the temperature of the chilled water has been lowered to a predetermined value, a valve 52 is interposed between the valve 44 and the cooling unit 17. The valve 52 is controlled by a solenoid 53 and is so constructed that it is opened when the solenoid is energized and is closed when the solenoid is deenergized. The operation of the solenoid is controlled by a switch 54 which is closed or opened in response to the temperature of chilled water in the pipe 40. As shown, the switch 54 is actuated by a bellows 56 responsive to expansion or contraction of a gas, volatile liquid or other expansible medium, confined in a pipe 58 and a bulb 60 which is in intimate contact with the chilled water in the coil 17. As shown, the bulb 60 is in contact with the pipe 40 immediately adjacent the bottom of the cooling unit, but it will be understood that this bulb may be placed on, or within, the body of the cooling unit, the only requirement being that the bulb be subjected to the temperature of the chilled water. The switch 54 and bellows 56 are so arranged that, when the temperature of the chilled water decreases to a desired value, as for example 38° F., the switch 54 is closed to energize the solenoid 53 and open the valve 52. Conversely, when the temperature of the water being chilled is above the desired value, the bellows 56 expands, the switch 54 is opened, the solenoid 53 is deenergized, and the valve 52 is closed. With valve 52 closed, no incoming water will flow into the cooling unit and, therefore, no water will flow through the cooling unit to the storage tank except for the limited amount contained in the vertical pipe forming part of the coil 17. It will be noted that, when the valve 52 is open, the rate of flow of water into the cooling unit will depend upon the extent to which the valve 44 is opened by the bellows 46.

I control the operation of the system in response to the level of the chilled water in the storage tank by providing the tank with a float 64 slidably carried by a guide rod 66. The guide rod is provided with an upper stop 68 and a lower stop 70 which limit the free movement of the float. The guide rod 66 is connected at its upper end to one end of a pivoted lever 72, the other end of which is operatively connected to a switch 74, which is shown as of the mercury type. The structure is such that when the float 64 abuts the stop 68 and moves the rod 66 upwardly, the lever 72 moves the switch from its "on" position, as shown in solid lines, to its "off" position, as shown in broken lines. Conversely, when the float abuts the lower stop 70 and pulls the rod 66 downwardly, the lever 72 returns the switch 74 to its "on" position.

The switch 74 controls the operation of the motor-compressor unit by energizing or deenergizing a solenoid 78 which operates the switch 19. The structure of the switch 19 is such that it is closed when the solenoid is energized and opened when the solenoid is deenergized. The circuit whereby the switch 74 controls the solenoid 78 is traced as follows: From conductor $L_2$, through wire 76, the switch 74, wires 80 and 82, the solenoid 78, and a wire 84 to the conductor $L_1$. The switch 74 also controls operation of the solenoid 53 in that, when the switch 74 is open, the circuit of the solenoid 53 cannot be completed even though the switch 54 may be closed. In other words, the closing of the switch 54 will energize the solenoid 53 only when the switch 74 is closed. The circuit whereby the switch 74 controls the valve 52 may be traced as follows: From the conductor $L_2$, the wire 76, the switch 74, the wire 80, a wire 88, the switch 54, a wire 90, the solenoid 53, and a wire 92 to the line conductor $L_1$.

*Operation*

When the tank is almost empty, so that the chilled water remaining therein is at a predetermined low level, the float 64 contacts the abutment 70 and further withdrawal of chilled water will cause the float to move the arm 66 downwardly so as to move the switch 74 from its lower "off" position to its upper "on" position. The closing of the switch 74 energizes the solenoid 78 which in turn closes the switch 19 to energize the motor compressor.

After a relatively long shut-down period of the compressor, which occurs while the chilled water in the tank is being used up, the temperature of the cooling unit 14 and the water in the coil 17 rises appreciably. The valve 52, therefore, remains closed and prevents flow of incoming water into the cooling unit and flow of water from the unit to the storage tank, until the temperature of the water and the coil 17 has been lowered to the desired value. When the water in the coil 17 has reached the desired low value, as for example, 38° F., the switch 54 is closed to energize the solenoid 53 and open the valve 52. The opening of the valve 52 permits water to flow through the valve 44 to displace the chilled water in the coil 17 which now flows into the storage tank.

The rate of flow of water through the valve 44, as above stated, is regulated by the temperature of the incoming water, so that the amount of water reaching the coil 17 will be such that it can be cooled by the refrigerating means to the desired value while the water flows in a continuous stream through the coil 17. Also, the amount of water admitted into the cooling coil 17 by the valve 44 will be such as to utilize the full capacity of the refrigerating means so that the refrigerating means will operate continuously, and under a substantially constant, full load, until the storage tank is filled. For example, if the refrigerating apparatus is capable of cooling 100 gallons of water per hour from 90° F. to 35° F., the flow of water to the coil 17 will be limited by the valve 44 to the rate of 100 gallons per hour whenever, and as long as, the temperature of the water in the pipe 38 is at 90° F. This represents a compressor load of 45,815 B. t. u. per hour, or substantially the amount of heat which the refrigerating means is capable of extracting during one hour of operation. As the temperature of the water in the pipe 38 drops, the flow of water into the coil 17 is proportionately increased by the valve 44 so that the amount of heat to be extracted will remain substantially constant. For example, if the temperature of the water in the pipe 38 should drop to 45° F., the flow of water through the valve 44 will be increased to 550 gallons per hour and the load incurred in cooling this amount of water from 45° F. to 35° F. will again be 45,815 B. t. u. per hour. In other words, the load on the compressor remains constant despite wide variation in the temperature of the incoming water.

When the tank is substantially filled and the chilled water therein reaches a predetermined high level, the float 64 abuts the stop 68 and further flow of chilled water into the tank causes the float 64 to move the rod 66 upwardly. The upward movement of the rod 66 actuates the lever 72 and moves the switch 74 from its upper "on" to its lower "off" position. The opening of the switch 74 deenergizes the solenoid 78 which opens the switch 19 and inactivates the motor compressor. Also, the opening of the switch 74 makes it impossible for the switch 54 to energize the solenoid 53 so that the valve 52 remains closed to prevent the flow of incoming water into the cooling unit, and hence, the flow of any water from the coil 17 into the storage tank as long as the switch 74 remains open and the motor compressor remains deenergized. The switch 74 remains in its lower "open" position while the chilled water in the storage tank is being used and until the level of the chilled water in the tank drops low enough to cause the float 64 to move the rod 66 downwardly and again close the switch 74.

It will thus be seen that the refrigerating means operates continuously and under a full and substantially constant load while the storage tank is being filled with water chilled to the desired low value, and that the refrigerating means remains inactive while the relatively large volume of chilled water stored in the tank is being used up. By this means, short-cycling of the motor compressor is eliminated, a more accurate control of the temperature of the chilled water is obtained, and the full capacity of the motor compressor is used at all times regardless of the variation of the temperature of the incoming water.

While the invention has been shown in but one form, it will be obvious to those skilled in the art that it is not so limited, but is susceptible of various changes and modifications without departing from the spirit thereof.

What is claimed is:

1. A fluid-chilling apparatus comprising a cooling unit, means including a valve for admitting the fluid to be chilled into said cooling unit, refrigerating means for extracting heat from the fluid admitted into said unit, and means, responsive to the temperature of the fluid to be chilled, for actuating said valve to increase the flow of said fluid into said cooling unit as the temperature of said fluid drops and to decrease the flow of said fluid into said cooling unit as the temperature of said fluid rises, thereby to chill a continuous stream of said fluid to the desired temperature while imposing a substantially constant and full load on said refrigerating means, regardless of variation in the the temperature of the fluid to be chilled.

2. The structure recited in claim 1 together with a second, normally closed valve for controlling the flow of chilled fluid from said cooling unit, and means responsive to the temperature of the chilled fluid to open said second valve only when the temperature of said fluid has been lowered to a predetermined value.

3. A liquid-chilling apparatus comprising a cooling unit, means including a valve for admitting the liquid to be chilled into said cooling unit, refrigerating means for extracting heat from the liquid admitted into said unit, means responsive to the temperature of the liquid to be chilled for actuating said value to increase the flow of said liquid into said cooling unit as the temperature of said liquid drops and to decrease the flow of said liquid into said cooling unit as the temperature of said liquid rises, thereby to chill said liquid to the desired value in a continuous stream, while imposing a substantially constant, full load on said refrigerating means, regardless of variation in the temperature of the liquid to be chilled, a storage tank adapted to receive the liquid chilled in said unit, and means for activating or inactivating said refrigerating means in response to the quantity of chilled liquid available in said tank.

4. A water-chilling apparatus comprising a cooling unit, means including a first valve for admitting water to be cooled into said unit, refrigerating means for extracting heat from the water admitted into said unit, means responsive to the temperature of the water to be cooled for actuating said first valve to increase the flow of water into said cooling unit as the temperature of said water drops and to decrease the flow of water into said cooling unit as the temperature of said water rises, thereby to chill the water to the desired low value while imposing a constant, full load on said refrigerating means, regardless of variation in the temperature of the water to be cooled, a first means operative, in a first position thereof, to activate said refrigerating means and operative in a second position thereof to inactivate said refrigerating means, a storage tank for receiving the water chilled in said unit, a second normally closed valve for controlling the flow of chilled water from said unit to said tank, second means operable only when said first means is in its first position, and the water in said unit has been cooled to a predetermined low value, to open said second valve to permit water to flow through said unit and into said tank, and means responsive to the level of the water in said tank to place said first means in its said first position to activate said refrigerating means and to render said second means operative to open said second valve, when the water in the tank reaches a predetermined low level, and to place said first means in its said second position to inactivate said refrigerating means and to prevent said second means from opening said second valve when the water in said tank reaches a predetermined high level.

5. Liquid-chilling apparatus comprising a liquid cooling unit, means including a valve for admitting liquid to be chilled into said cooling unit, refrigerating means for extracting heat from the liquid admitted into said cooling unit, means for actuating said valve to increase the flow of said liquid into said cooling unit as the temperature thereof drops and to decrease the flow thereof as said temperature rises, thereby tending to maintain a substantially constant desired temperature of the cooled liquid regardless of variation in temperature of the liquid to be cooled, a liquid storage tank arranged to receive the chilled liquid from said cooling unit, and means for initiating flow of liquid to be cooled into said cooling unit and for initiating operation of said refrigerating means in response to the liquid in said storage tank dropping to a predetermined low level and for terminating said flow and said operation in response to said liquid rising to a predetermined high level.

IRVING S. RITTER.